US009454463B2

(12) United States Patent
Kota et al.

(10) Patent No.: US 9,454,463 B2
(45) Date of Patent: Sep. 27, 2016

(54) RAPID AUTOMATION FRONT-END FRAMEWORK LIBRARY AND EXECUTABLE GRAPHIC USER INTERFACE TESTING SYSTEM AND METHOD

(75) Inventors: Sudhindra Aithal Kota, Bangalore (IN); Sakthi Shalini Kannan, Bangalore (IN); Prashanth Kota, Karnataka (IN); Vinaya Nadig, Bangalore (IN); Gaurav Agarwal, Meerut (IN); Manish K. Agarwal, Haryana (IN); Jayaram Hanumanthappa, Bangalore (IN); Rajasekar Venkatesan, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 365 days.

(21) Appl. No.: 12/898,384

(22) Filed: Oct. 5, 2010

(65) Prior Publication Data
US 2012/0084684 A1  Apr. 5, 2012

(51) Int. Cl.
*G06F 11/36* (2006.01)
*G06F 11/34* (2006.01)

(52) U.S. Cl.
CPC ........ *G06F 11/3672* (2013.01); *G06F 11/3414* (2013.01); *G06F 11/3438* (2013.01)

(58) Field of Classification Search
CPC ............. G06F 11/302; G06F 11/3438; G06F 11/3668
USPC ........................................................ 715/762
See application file for complete search history.

(56) References Cited

U.S. PATENT DOCUMENTS

| 6,408,403 | B1 * | 6/2002 | Rodrigues et al. ........ 714/38.11 |
|---|---|---|---|
| 6,526,526 | B1 * | 2/2003 | Dong et al. ...................... 714/46 |
| 7,222,265 | B1 * | 5/2007 | LeSuer ............... G06F 11/3414 |
| | | | 714/38.1 |
| 7,337,431 | B1 * | 2/2008 | Barnes et al. ................ 717/124 |
| 7,519,864 | B2 * | 4/2009 | Alam et al. ..................... 714/32 |
| 7,823,132 | B2 * | 10/2010 | Ulrich et al. ................ 717/126 |
| 8,271,950 | B2 * | 9/2012 | Bharadwaj .................... 717/124 |
| 2003/0046377 | A1 * | 3/2003 | Daum et al. .................. 709/223 |

* cited by examiner

*Primary Examiner* — Alvin Tan
(74) *Attorney, Agent, or Firm* — Dunlap Codding PC; David L. Soltz (57) ABSTRACT

A computer system comprising a display, one or more computer readable medium storing a computer application comprising computer executable code for creating a graphical user interface, one or more processors receiving and executing the computer executable code to provide the graphical user interface on the display, the computer readable medium also storing a testing application comprising computer executable code for activating the graphical user interface, the testing application defining a command execution server embedded into the computer application, and a command client external to the computer application. Upon execution by the one or more processors, the command execution server receives a command for the graphical user interface, enables the execution of the command by the computer application by generating a graphical user interface event in the graphical user interface of the computer application, and sends an acknowledgement to the command client responsive to the completed execution of the command.

17 Claims, 7 Drawing Sheets

RAPID AUTOMATION FRONT-END FRAMEWORK LIBRARY AND EXECUTABLE GRAPHIC USER INTERFACE TESTING SYSTEM AND METHOD

I. CROSS-REFERENCE TO RELATED APPLICATIONS

None.

II. FIELD OF THE INVENTION

The inventive concept(s) disclosed herein generally relate to graphical user interface testing, and more particularly, but not by way of limitation, to a computer system for automatic graphical user interface testing and method of using the same.

III. BACKGROUND OF THE INVENTION

A. Graphical User Interface

On many modern computing systems, the Graphical User Interface ("GUI") is the main mode of interaction for a user with any software. As opposed to command-line interfaces ("CLI"), GUIs provide a convenient, user-friendly environment for users to interact with computer systems. The typical GUI is made up of components that are visually perceived or interacted with by the end user, such as windows, icons, menus, and pointers. Users drag the mouse pointer, click buttons, and enter various keyboard combinations.

Although a component of a GUI may appear to the user as a single item, the component may actually consist of a number of separate components or sub-components that have been combined together. The typical GUI can support hundreds, if not thousands, of combinations of user control actions. For example, in a word processor, a user can point the mouse to select an item on the menu bar, to click an icon, or to highlight blocks of text on the viewer windows. Similarly, a user can use keyboard input to interact with a computer application. For instance, in a word processor, a user can enter "CTRL-C", "CTRL-V", or other predefined keyboard combinations to access program features. Based on the input from the mouse or keyboard, the computer executes the computer application to manipulate what is displayed on the screen as well as what is saved in files or actions taken by the computer application.

B. GUI Test Automation

To ensure a computer application meets its specifications, the computer application will go through GUI testing before being released. GUI testing is the process of testing a computer application that uses a graphical user interface for quality assurance by subjecting the computer application to a series of test cases. To generate a good set of test cases, the testers must be certain that their tests cover all functionality of the system and also has to ensure the test fully exercises the GUI. Ultimately, GUI tests are important because they are performed from the end-user's view of the application.

Manual GUI testing of modern computer applications is difficult, as it is almost impossible or impractical to test all possible GUI combinations every time the underlying code changes. Further, manual interaction with the GUI often results in mistakes. Thus, GUI test automation is strongly preferred, if not mandatory to ensure that all possible GUI combinations can be tested thoroughly and correctly. Automated tests enable testers to concentrate on testing new features, enabling developers to refactor and add new features without worrying about breaking existing functionality, and reducing the time to market.

However, current GUI test automation is inefficient. The current tools available to test GUI-based applications are either expensive or generic to record user actions on a graphic intensive GUI. Further, automated test cases require extensive programming and are highly susceptible to missed events or timing issues.

Thus, there is a need for an easier, cheaper, and better solution for GUI test automation. A good GUI test automation setup should be easy to use, easy to maintain, generate test scripts without too much effort from the tester, provide ways to verify the results of the test execution and interact only with the UI and preferably not with any underlying business logic.

IV. SUMMARY OF THE INVENTION

In one aspect the present disclosure is directed to a computer system. The computer system comprises a display, one or more computer readable medium storing a computer application comprising computer executable code for creating a graphical user interface, one or more processors receiving and executing the computer executable code to provide the graphical user interface on the display, the one or more computer readable medium also storing a testing application comprising computer executable code for activating the graphical user interface, the testing application defining a command execution server embedded into the computer application, and a command client external to the computer application, wherein, upon execution by the one or more processors, the command execution server receives a command for the graphical user interface from the command client, enables the execution of the command by the computer application by generating a graphical user interface event in the graphical user interface of the computer application, and sends an acknowledgement to the command client responsive to the computer application completing execution of the command. The command execution server includes a verification module to compare first graphical user interface values of the computer application after command execution to second graphical user interface values specified in the command to be verified, and to generate an alert responsive to the first graphical user interface values and the second graphical user interface values being mismatched. The computer executable code of the computer application defines a GUI application having windows that register with the command execution server.

Another aspect of the present disclosure is directed to a computer system, comprising a display, one or more computer readable medium storing a computer application comprising computer executable code for creating a graphical user interface, and one or more processors receiving and executing the computer executable code to provide the graphical user interface on the display. The one or more computer readable medium also storing a testing application comprising computer executable code for activating the graphical user interface of the computer application, the testing application defining a command execution server embedded into the computer application, and a command client external to the computer application. The command execution server comprises: a playback module for interpreting commands received from the command client and executing commands by generating graphical user interface events in the graphical user interface of the computer application, and a verification module for comparing first graphical user interface values of the computer application after command execution to second graphical user interface values specified in the command to be verified and generating an alert responsive to the first graphical user interface values and the second graphical user interface values being mismatched.

Another aspect of the present disclosure is directed to a method, comprising the steps of: receiving a command by a command execution server embedded in a computer application that is being executed by one or more processors of a computer system from a command client external of the computer application; converting the command to a graphical user interface event; supplying the graphical user interface event to a GUI application of the computer application; monitoring execution of the graphical user interface event by the command execution server; and supplying an acknowledgement of completion of execution of the graphical user interface event by the command execution server to the command client. The command execution server includes a verification module to compare first graphical user interface values of the computer application after command execution to second graphical user interface values specified in the command to be verified, and further comprising the step of generating an alert by the verification module responsive to the first graphical user interface values and the second graphical user interface values being mismatched. The computer application includes computer executable code defining the GUI application having windows, and wherein the method further comprises the step of registering the windows with the command execution server.

In yet another aspect, the present disclosure is directed to an article, comprising one or more computer readable medium storing a computer application comprising computer executable code for creating a graphical user interface that upon execution by one or more processors causes the one or more processors to (1) receive a command by a command execution server embedded in the computer application that is being executed by the one or more processors from a command client external of the computer application, (2) convert the command to a graphical user interface event, (3) supply the graphical user interface event to a GUI application of the computer application, (4) monitor execution of the graphical user interface event by the command execution server, and (5) supply an acknowledgement of completion of execution of the graphical user interface event by the command execution server to the command client. Upon execution by one or more processors, the computer executable code further causes the one or more processors to (1) compare by a verification module first graphical user interface values of the computer application after command execution to second graphical user interface values specified in the command to be verified, and (2) generate an alert by the verification module responsive to the first graphical user interface values and the second graphical user interface values being mismatched.

In yet another aspect, the present disclosure is directed to an article, comprising one or more computer readable medium storing a computer application comprising computer executable code for creating a graphical user interface, the one or more computer readable medium also storing a testing application comprising computer executable code for activating the graphical user interface, the testing application defining a command execution server embedded into the computer application, and a command client external to the computer application. The command execution server is adapted to cause one or more processors to receive a command for the graphical user interface from the command client, enable the execution of the command by the computer application by generating a graphical user interface event in the graphical user interface of the computer application, and send an acknowledgement to the command client responsive to the computer application completing execution of the command. The command execution server includes a verification module to compare first graphical user interface values of the computer application after command execution to second graphical user interface values specified in the command to be verified, and to generate an alert responsive to the first graphical user interface values and the second graphical user interface values being mismatched. The computer executable code of the computer application defines a GUI application having windows that register with the command execution server.

In the various aspects, the command can be a first command, and the command client can be adapted to send a second command for the graphical user interface to the command execution server responsive to receiving the acknowledgement from the command execution server.

V. BRIEF DESCRIPTION OF THE DRAWINGS

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings.

V. DETAILED DESCRIPTION OF THE INVENTION

Before explaining at least one embodiment of the inventive concept(s) disclosed herein in detail, it is to be understood that the inventive concept(s) is not limited in its application to the details of construction and the arrangement of the components or steps or methodologies set forth in the following description or illustrated in the drawings. The inventive concept(s) disclosed herein is capable of other embodiments or of being practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding of the disclosure. However, it will be apparent to one of ordinary skill in the art that the concepts within the disclosure may be practiced without these specific details. In other instances, well-known features have not been described in detail to avoid unnecessarily complicating the description. The term "signal path" as used herein refers to any suitable communication methodology for intra-computer communication, as well as extra-computer communication. For example, a signal path can be hardware and/or software associated with communication via sockets, or by any other method of communication known in the art.

The inventive concept(s) disclosed herein is directed to a graphical user interface (GUI) test automation framework named Rapid Automation Front-end Framework Library and Executable (RAFFLE). RAFFLE is a GUI test automation framework that overcomes the limitations of existing GUI automation software.

Figure 1:
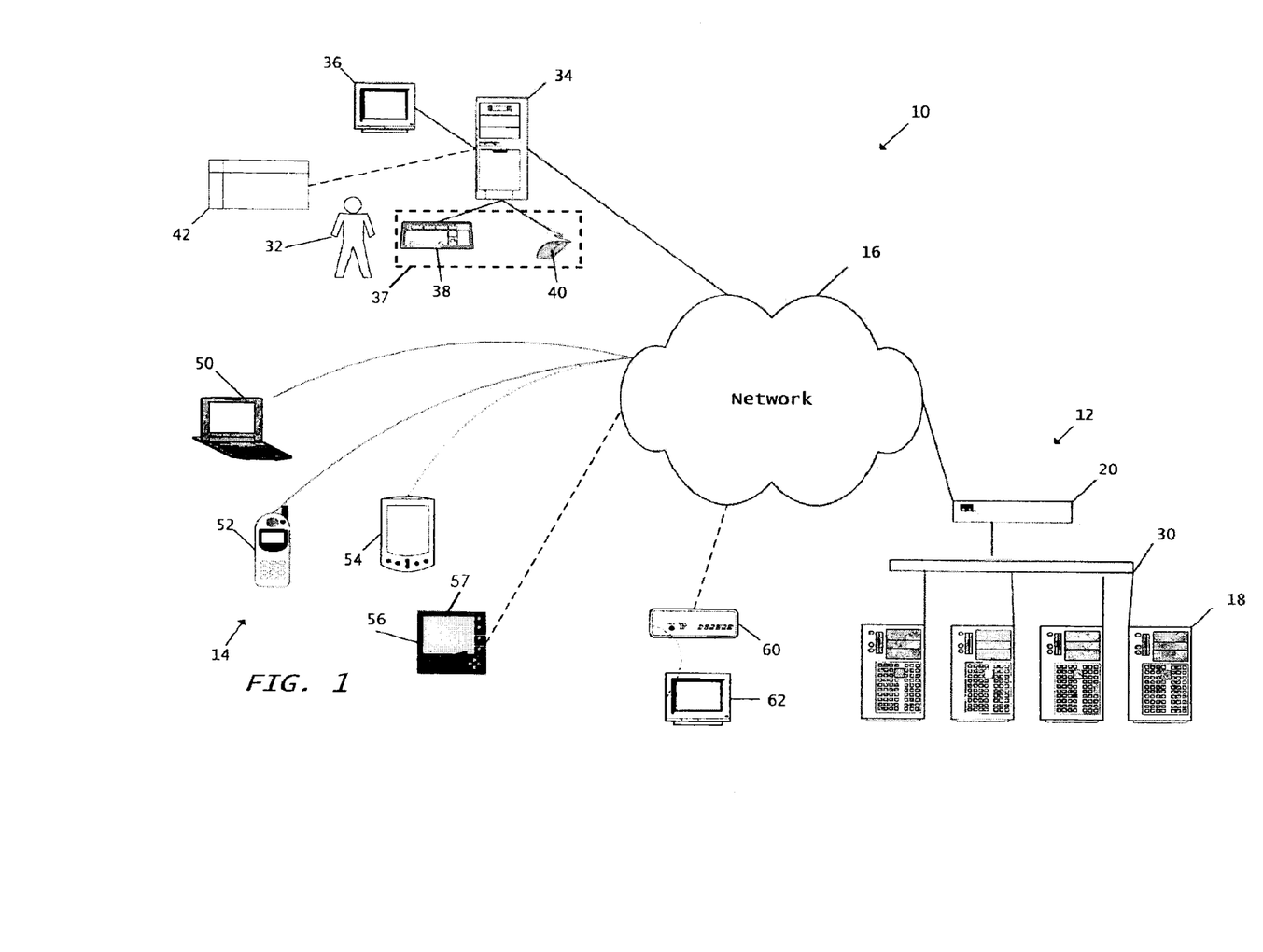
FIG. 1 is a schematic diagram of the hardware forming an exemplary embodiment of a computer system constructed in accordance with the present invention.

Referring now to the drawings and in particular to FIG. 1, shown therein and designated by a reference numeral 10 is an exemplary computer system constructed in accordance with the present disclosure. The computer system 10 is a system or systems that are able to embody and/or execute the logic of the processes described herein. The logic embodied in the form of software instructions, or firmware may be executed on any appropriate hardware which may be a dedicated system or systems, or a personal computer system, or distributed processing computer system.

Preferably, the computer system 10 is distributed, and includes a host system 12, communicating with one or more user devices 14 via a network 16. The network 16 can be the Internet or other network. In either case, the host system 12 typically includes one or more servers 18 configured to communicate with the network 16 via one or more gateways 20. When the network 16 is the Internet, the primary user interface of the computer system 10 is delivered through a series of web pages, but the primary user interface can be replaced by another type of interface, such as a Windows-based application. This method is also used when deploying the computer system 10 in a stand-alone environment such as a kiosk.

The network 16 can be almost any type of network although Internet and Internet 2 networks are preferred because of the wide support of their underlying technologies. The preferred embodiment of the network 16 exists in an Internet environment, which means a TCP/IP-based network. It is conceivable that in the near future, the preferred or other embodiments, may wish to use more advanced networking topologies.

The servers 18 can be networked with a LAN 30. The gateway 20 is an entity responsible for providing access between the LAN 30 and the network 16. The gateway 20 can also be used as a security means to protect the LAN 30 from attack from external networks such as the network 16.

The LAN 30 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one preferred embodiment, the host system 12 includes the servers 18. The configuration of the server hardware will depend greatly upon the requirements and needs of the particular embodiment of the computer system 10. Typical embodiments, including the preferred embodiment, will include multiple servers 18 with load balancing to increase stability and availability. It is envisioned that the servers 18 will include database servers and application/web servers. The database servers are preferably separated from the application/web servers to improve availability and also to provide the database servers with improved hardware and storage.

The user devices 14 can be any number and type of devices. The most typical scenario of the user device 14 involves an end user 32, using a computer 34 with a display 36, and one or more input device 37, such as a keyboard 38, and mouse 40. The display 36 can be a single monitor or multiple adjacent monitors. Typically, the user device 14 uses a type of software called a "browser" as indicated by a reference numeral 42 to render HTML/XHTML content that is generated when requesting resources from a source, such as the host system 12. In the preferred embodiment, the computer system 10 is designed to be compatible with major Web Browser vendors (Microsoft Internet Explorer, Mozilla Firefox, Google Chrome, Opera, and the like) and the host system 12 can be organized as a web site. Other embodiments may wish to focus on one particular browser depending upon the common user base using the computer system 10.

The user devices 14 can also be implemented as a portable device such as a laptop computer 50 (or handheld computer); a cellular telephone 52 with a micro or embedded Web Browser; a Portable Digital Assistant 54 (PDA) capable of wireless network access; a pen-based or tablet computer 56 having a touchscreen 57. In another embodiment, the user device 14 can be a cable box 60 or other similar device for viewing through a display 62 or television. Current embodiments of computer system 10 can also be modified to use any of these or future developed devices.

The computer system 10 is designed in this way as to provide flexibility in its deployment. Depending upon the requirements of the particular embodiment, the Engine could be designed to work in almost any environment such as a desktop application, a web application, or even simply as a series of web services designed to communicate with an external application.

The hardware and system software are designed with two key concerns; flexibility and scalability. Although some specifics for software and hardware components may be mentioned herein, it will be understood that a wide array of different components could be substituted, such as using different database vendors or even replacing the databases with XML-based document stores.

When the computer system 10 is used to execute the logic of the processes described herein, such computer(s) and/or execution can be conducted at a same geographic location or multiple different geographic locations. Furthermore, the execution of the logic can be conducted continuously or at multiple discrete times.

Figure 5:
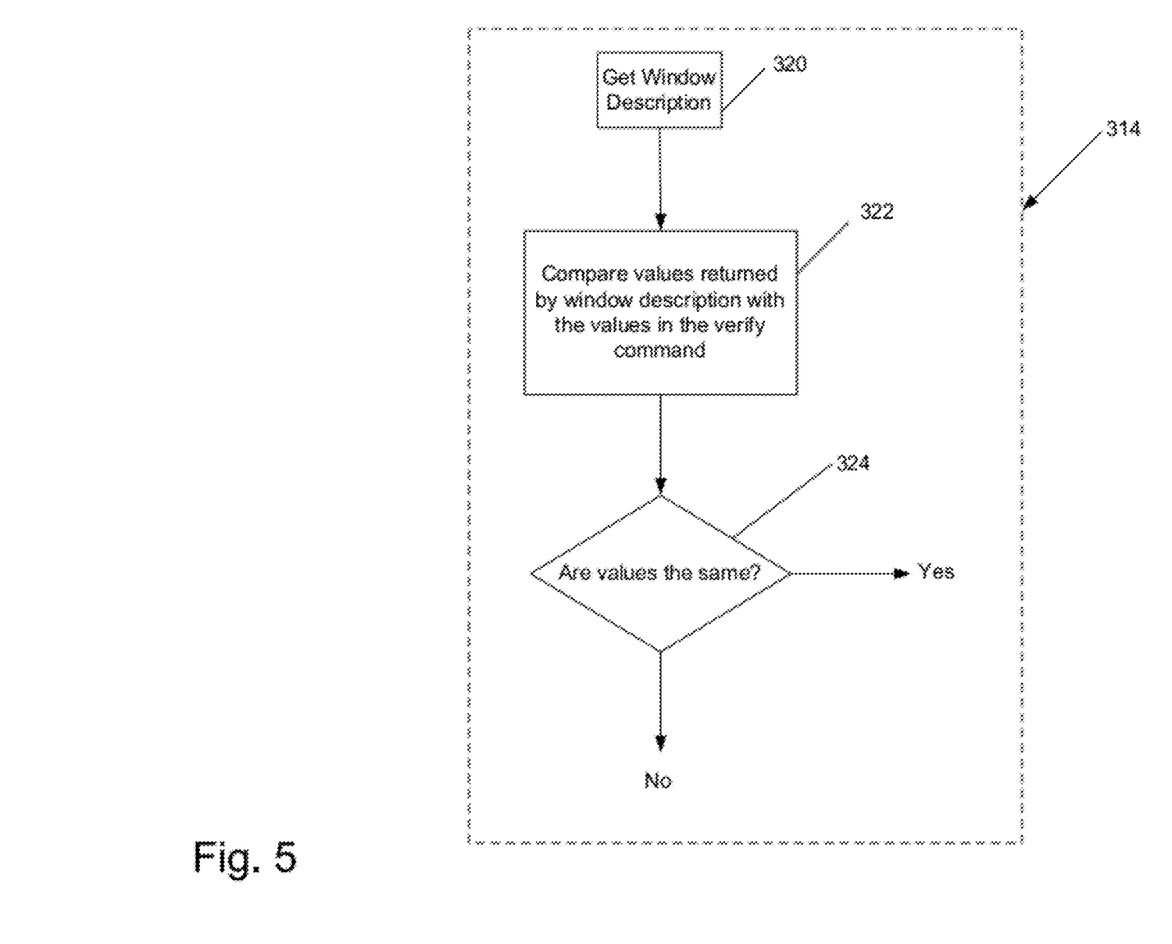
FIG. 5 is a flow chart showing an exemplary process for command verification in accordance with the inventive concept(s) disclosed herein.

In general, the computer system 10 includes one or more computer readable medium 64 storing a computer application 66 comprising computer executable code for creating a graphical user interface 68, an example of which is shown in FIG. 5. The one or more computer readable medium 64 can be a part of the host system 12, one or more of the user devices 14 or combinations thereof.

Figure 2:
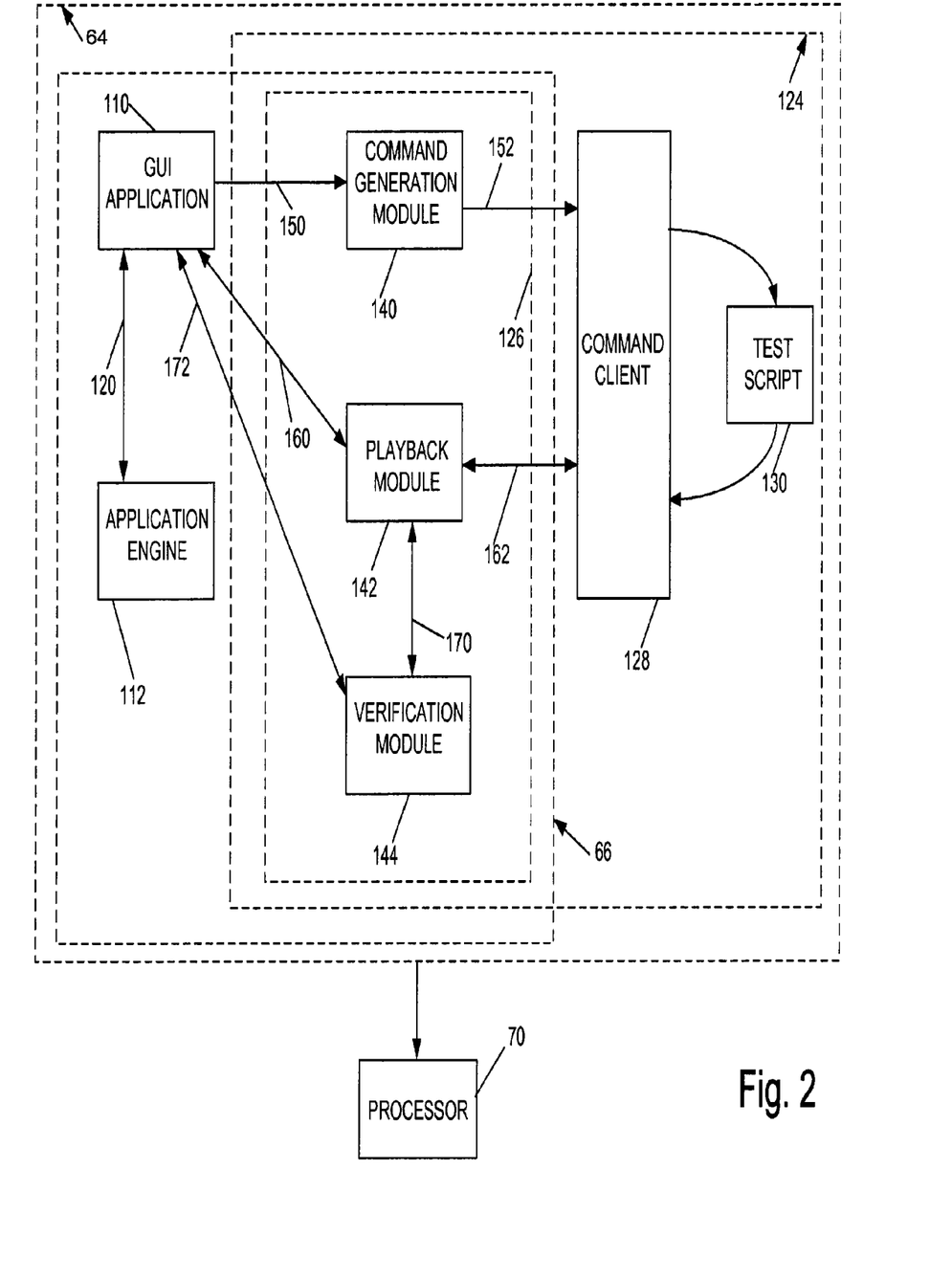
FIG. 2 is a block diagram showing a computer readable medium storing a computer application and a testing application in accordance with the present disclosure.

The computer system 10 also includes one or more processor 70 as shown in FIG. 2 that is capable of communicating with the computer readable medium 64, as well as reading and/or executing the computer executable code. The one or more processor 70 can be located at any location relative to the computer readable medium 64, as long as the one or more processor 70 is able to communicate with the computer readable medium 64. The one or more processor 70 may, for example, be implemented as one or more microprocessors, one or more microcontrollers, one or more field-programmable gate arrays, one or more digital signal processors, or the like. It is to be understood that the one or more processor 70 may contain one, two, three, or a plurality of: microprocessors, microcontrollers, field-programmable gate arrays, digital signal processors, or the like, or any combination thereof. Further, the one or more processor 70 can be a part of the host system 12, one or more of the user devices 14 or combinations thereof.

Figure 6:
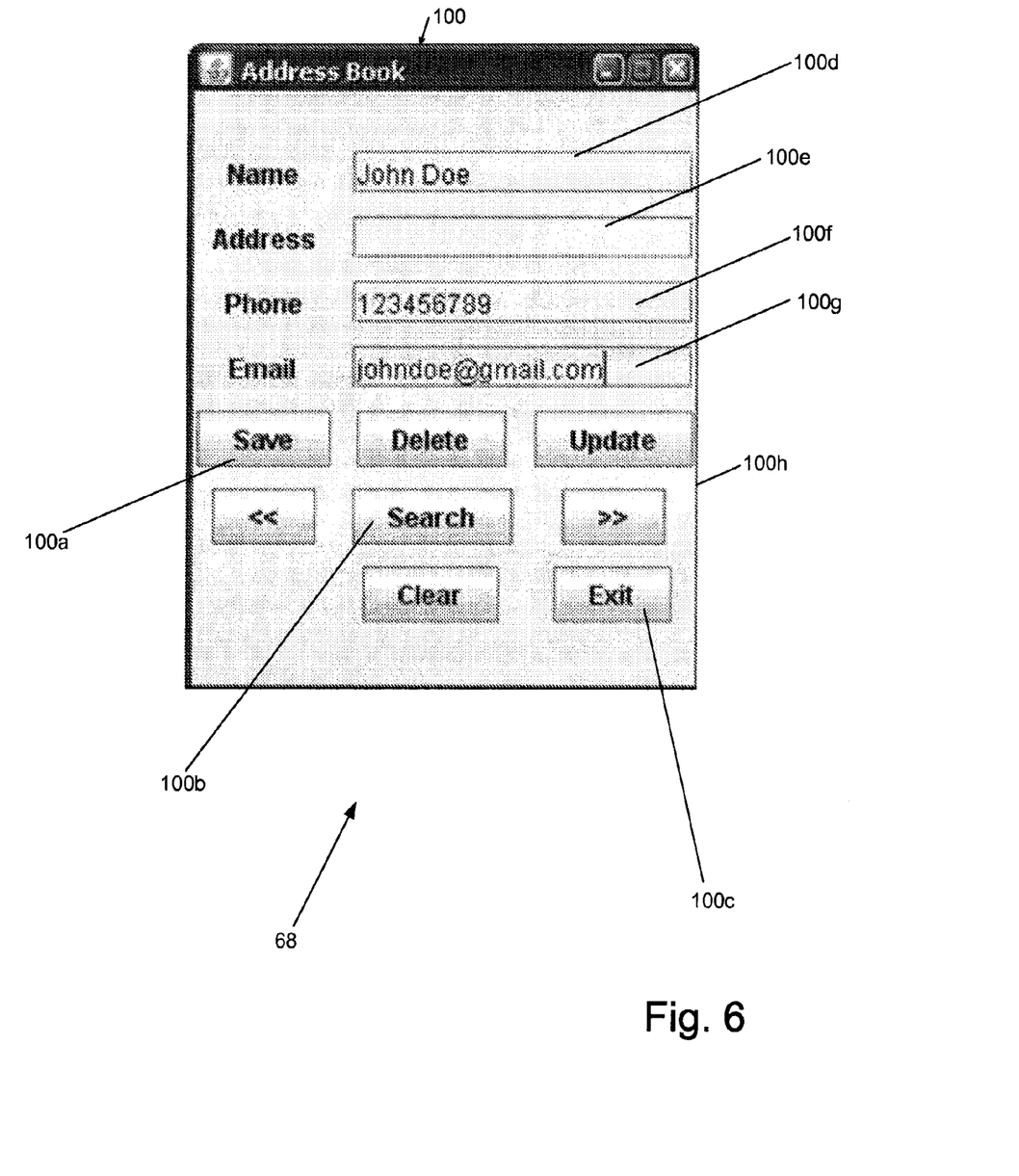
FIG. 6 is a diagram of one or more components of an exemplary graphical user interface disclosed herein.

The computer application 66 is generally designed to help the end user 32 perform a singular task, such as an address book, or multiple related specific tasks. Typical examples of the computer application 66 include an address book, a word processor, a spreadsheet, a media player and a database application. The graphical user interface 68 is a type of user interface which includes the selection and/or manipulation of graphical components 100. For example, as shown in FIG. 6, the graphical components can includes one or more buttons 100a, 100b and 100c, fields 100d-g, a window 100h surrounding the other graphical components as well as icons, pictures, and menus for example.

The computer application 66 includes a GUI application 110 and an application engine 112. The GUI application 110 creates the graphical user interface 68 on the display 36 or 62, for example, as well as receives user action from the end user 32. More particularly, the graphical components 100 of the graphical user interface 68 are used to receive user action and to generate graphical user interface events, such as mouse clicks or text, for interacting with the application engine 112 as indicated by a signal path 120. The GUI application 110 and the graphical user interface 68 are typical of Macintosh and Windows environments and may be supported by client-server technology. The graphical components 100 of the graphical user interface 68 can be selected and/or manipulated utilizing any suitable input device 37, such as the keyboard 38, or the mouse 40. In addition, the input device 37 could be implemented as the touchscreen 57.

The application engine 112 receives the graphical user interface events via the signal path 120 and performs one or more of the tasks for the computer application 66. For example, assuming that the computer application 66 is an address book application, the application engine 112 would perform various tasks such as receiving information regarding names and addresses to store within the address book application, storing the names and addresses within a file and/or database associated with the address book application, and searching through the file and/or database for a particular one of the names and addresses.

Although the computer system 10 is described herein by way of example as the computer application 66 being an address book, it should be understood that the computer application 66 can be other types as discussed above.

The one or more computer readable medium 64 also stores a testing application 124 comprising computer executable code for testing the graphical user interface 68 of the computer application 66. As shown in FIG. 2, the testing application 124 defines a command execution server 126 embedded into the computer application 66, and a command client 128 external to the computer application 66.

In general, the command execution server 126 is responsible for converting every user action in the graphical user interface 68 of the computer application 66 into commands and also for converting commands into graphical user interface events in the computer application 66 during playback, i.e., testing of the computer application 66. The command client 128 is used to capture commands into one or more files 130 and for supplying commands to the command execution server 126 during playback. During playback, the command execution server 126 receives a first command for the graphical user interface 68 from the command client 128, enables the execution of the first command by the computer application 66 by generating a graphical user interface event and supplying such graphical user interface event to the GUI application 110, and sends an acknowledgment to the command client 128 responsive to the computer application 66 completing execution of the first command. Upon receipt of the acknowledgment, the command client 128 provides a second command to the command execution server 126. This enables the playback to be synchronous and execute as fast as the computer application 66 can run by avoiding fixed delays and/or sleeps in the testing application 124.

In general, the command execution server 126 is provided with a command generation module 140, a command playback module 142, and a verification module 144.

The command generation module 140 is adapted to register one or more graphical components 100 of the graphical user interface 68, and monitor control flow resulting from user actions. The command generation module 140 can also convert such control flow into commands. In particular, the command generation module 140 receives the control flow resulting from user actions from the GUI application 110 via a signal path 150, generates the commands and supplies the commands to the command client 128 by a signal path 152.

The command playback module 142 communicates with the GUI application 110 by a signal path 160, and also communicates with the command client 128 via a signal path 162. The command playback module 142 is capable of activating the GUI application 110 by generating graphical user interface events and supplying same to the graphical components 100 of the graphical user interface 68. In particular, the command playback module 142 receives sequential commands from the command client 128 via the signal path 162. The command playback module 142 has access to the graphical components 100 of the graphical user interface 68 including all the windows 100h of the computer application 66 and can activate the GUI application 110 by converting the commands into graphical user interface events and then dispatching the commands to the graphical components 100 of the graphical user interface 68 via the signal path 160 and the GUI application 110. Because the command playback module 142 has access to the graphical components 100 of the graphical user interface 68, the command playback module 142 is also aware of when exactly the application engine 112 completes execution of a graphical user interface event. Responsive to the application engine 112 completing execution of the graphical user interface event, the command playback module 142 generates the acknowledgment and sends the acknowledgment to the command client 128 via the signal path 162 thereby enabling the command playback module 142 of the command execution server 126 and the command client 128 to operate in a synchronous manner and preferably without any fixed delays and/or sleeps involved.

The verification module 144 receives input from the command playback module 142 indicative of a command to be verified via a signal path 170, and also monitors the application engine 112 via a signal path 172 to determine whether the command was executed by the application engine 112 by comparing the current values within the graphical user interface 68 of the computer application 66 to the values specified in the command to be verified. The verification module 144 can receive information from the application engine 112 to determine if current values within the graphical user interface 68 of the computer application 66 match the values for the graphical user interface specified in the command to be verified.

The command execution server 126 and the command client 128 are adapted to communicate bilaterally utilizing the signal paths 152 and 162. The signal path 152 and 162 are preferably sockets, however, it should be understood that other suitable methods may be used. It is to be understood that the command execution server 126 and the command client 128 may be located remotely from each other as long as they are able to bilaterally communicate. For example, the command execution server 126 and the command client 128 may communicate over the internet, a phone network, a wireless connection, an infrared connection, a USB connection, a fiber-optic cable, or over any other suitable connection.

The command client 128 is adapted to store the commands in one or more files 130 and store such files 130 on the computer readable medium 64. The command client 128 is also adapted to retrieve the commands from the computer readable medium 64. The computer readable medium 64 may be any computer readable medium such as a computer hard drive, an external hard drive, a memory card, a flash USB-drive, a floppy disc, a solid state drive, an internet server, an internet cloud, CD-ROM, DVD-ROM, RAM, any other suitable memory, or a combination of two or more types of memories. Additionally, the computer readable medium 64 on which the command client 128 is stored may be different from the computer readable medium 64 on which the command client 128 stores information, and the computer readable medium 64 may be located remotely from the computer readable medium on which command client 128 is stored, as long as the command client 128 is able to store information on and/or retrieve information from the computer readable medium 64. There may also be multiple computer readable mediums 64, wherein the command client 128 stores information on a first computer readable medium (not shown) and retrieves information from a second computer readable medium (not shown). The command client 128 and the computer readable medium 64 may communicate via any suitable communication channel, including the internet, a telephone network, an infrared connection, a USB connection, a fiber-optic cable, and a wireless connection.

Figure 3:
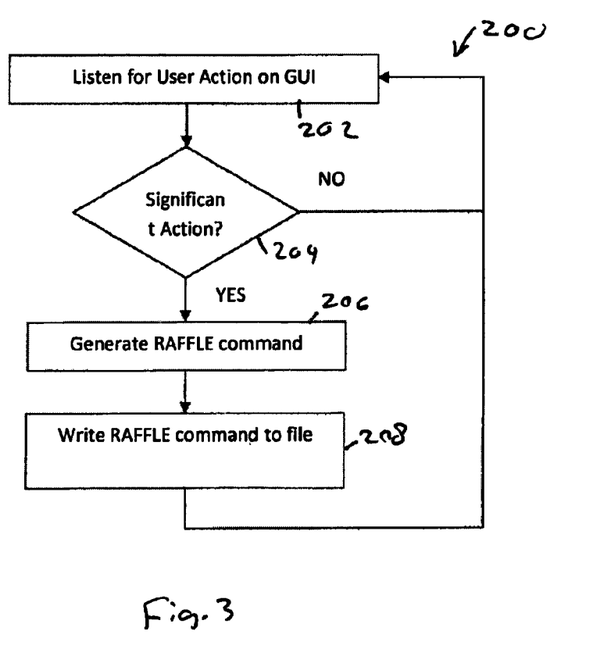
FIG. 3 is a flow chart showing an exemplary process for generating commands in accordance with an embodiment of the inventive concept(s) disclosed herein.

Referring now to FIG. 3, shown therein is a block diagram of command generation logic 200 which is run by the command generation module 140 for generating the commands. As shown by a step 202 the end user 32 interacts with the graphical user interface 68 of the computer application 66 by inputting actions such as mouse clicks, keystrokes, voice commands, or the like, and the command generation module 140 monitors the control flow and then branches to a step 204 when user action is detected. Within the step 204, the command generation module 140 determines whether the user action is significant (i.e. whether the user action results in the GUI application 110 generating a command). Whether or not particular user action is determined to be significant is based on the design of the GUI application 110 and/or the command generation module 140. If the command generation module 140 determines the user action to be significant, the command generation module 140 branches to a step 206 to generate a command indicative of the user action. The command generation module 140 then branches to a step 208 in which the command generation module 140 writes the command to a file, and then communicates the command to the command client 128. The command generation module 140 then branches from the step 208 to the step 202 to continue listening for further user action. In the event that at the step 204 the command generation module 140 determines that the user action is not significant, then the command generation module 140 branches from the step 204 to the step 202.

In general, the command contains sufficient information for the command to be converted back to a graphical user interface event to be played back and mimic the user action that created the command. The command client 128 receives the command from the command generation module 140 of the command execution server 126 and stores the command into the one or more file 130 on the computer readable medium 64. Preferably, a sequence of two or more commands is stored into the computer readable medium 64 as a test script of commands to be executed in a sequence by the RAFFLE framework in order to automate a test case of the computer application 66. In one embodiment, the commands preferably have the following format:

userAction key1:value1 key2:value2 key3:value3

In this example, userAction—can be any user action on the graphical user interface 68 such as a mouse click, a key pressed, a menu selected etc. Key1:value1 represent a key-value pair which contains information to successfully mimic the user action. The following is an exemplary command.

mouseClick action: leftSingleClick id: xxx windowType: windowType1 windowIdentifier: windowId1

This command can be interpreted as follows. There was a mouse single left click on an object with identifier xxx in the window with window type windowType1 and windowIdentifier windowId1.

Figure 4:
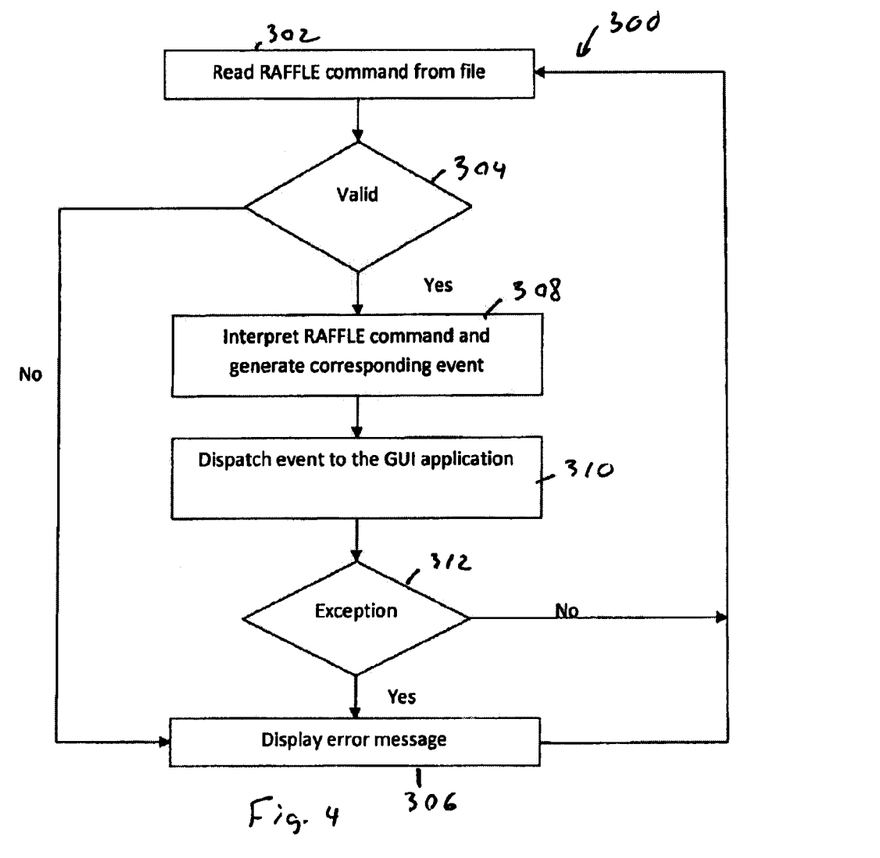
FIG. 4 is a flow chart showing an exemplary process for playing back commands in accordance with the inventive concept(s) disclosed herein.

Referring now to FIG. 4, shown therein is a block diagram describing a command playback logic 300 running on the computer system 10. The command playback logic 300 includes a step 302, preferably executed by the command client 128 in which the command client 128 reads a command from the file 130 and then transmits the command to the command playback module 142. The command playback logic 300 then branches to a step 304 where the command playback module 142 determines whether the command is valid. The validity of the command can be checked with a variety of manners, such as comparing the command to a list of valid commands stored within the computer application 66. An invalid command causes the command playback logic 300 to branch from the step 304 to a step 306 resulting in an error message being displayed on the graphical user interface 68 of the computer system 10. A valid command causes execution of the command playback logic 300 to branch to steps 308 and 310 where the command is interpreted by the command playback module 22 and the graphical user interface 68 of the computer application 66 is activated by dispatching one or more corresponding graphical user interface events into the window(s) of the graphical user interface 68 of the computer application 66. Thus, a mouse click command is translated into a mouse click event, with information on which specific component 100 is being manipulated, e.g., which specific window and where on that window to click the mouse; and a keystroke event can be translated to a keyboard event. Next, the command playback logic 300 branches to a step 312 where the verification module 144 verifies the command was executed by comparing the current values within the graphical user interface 68 of the computer application 66 to the values specified in the command to be verified. If the values match, the command playback logic 300 branches to the step 302, and if not the command playback logic 300 branches to the step 306 to display an error message.

Referring now to FIG. 5, shown therein is a block diagram of command verification logic 314 followed by the command verification module 144 in step 312 of the command playback logic 300 as discussed above. Initially, the command verification logic 314 branches to a step 320, where the command verification module 144 obtains a window description from the graphical user interface 68 of the GUI application 110. To support verification, every window in the GUI application 110 preferably describes itself to the command verification module 144. The output of this description is preferably structured as a nested key-value pair as exemplified in FIG. 7 below. Next, the command verification logic 314 branches into steps 322 and 324, wherein the command verification module 144 compares the current values on the graphical user interface 68 to values in the command to be verified. A different value or set of values causes the command verification logic 314 to branch to step 306 resulting in an error message being displayed on the graphical user interface 68 of the computer system 10. The same value or set of values causes the command verification logic 314 to branch to step 302. The verification logic 314 can be used to compare values on the graphical user interface 68 at the time of testing to values on the graphical user interface 68 later (a new release, bug fix, code re-factor or the like). The values on the graphical user interface 68 can be obtained from components such as dialogs, panels, tree, JGraph windows or the like. Thus, verification can identify changes in the graphical user interface 68 values resulting from code change and/or behavior change.

Referring now to FIG. 6, shown therein is an exemplary GUI command verification window 100h in accordance with the inventive concept(s) disclosed herein. To support verification, every window in the GUI application 110 preferably describes itself to the command generation module 140 and/or to the command verification module 144. The output of this description is preferably structured as a nested key-value pair. As an example if a panel PANEL1 contains 3 text-fields and another panel PANEL2 which contains 2 text fields, then PANEL1 will return 4 key-value pairs 3 for the text fields and 1 for PANEL2. The value in the key-value pair for PANEL2 in turn will contain 2 key-value pairs. Thus the description of a window is a nested key-value data structure.

Figure 7:
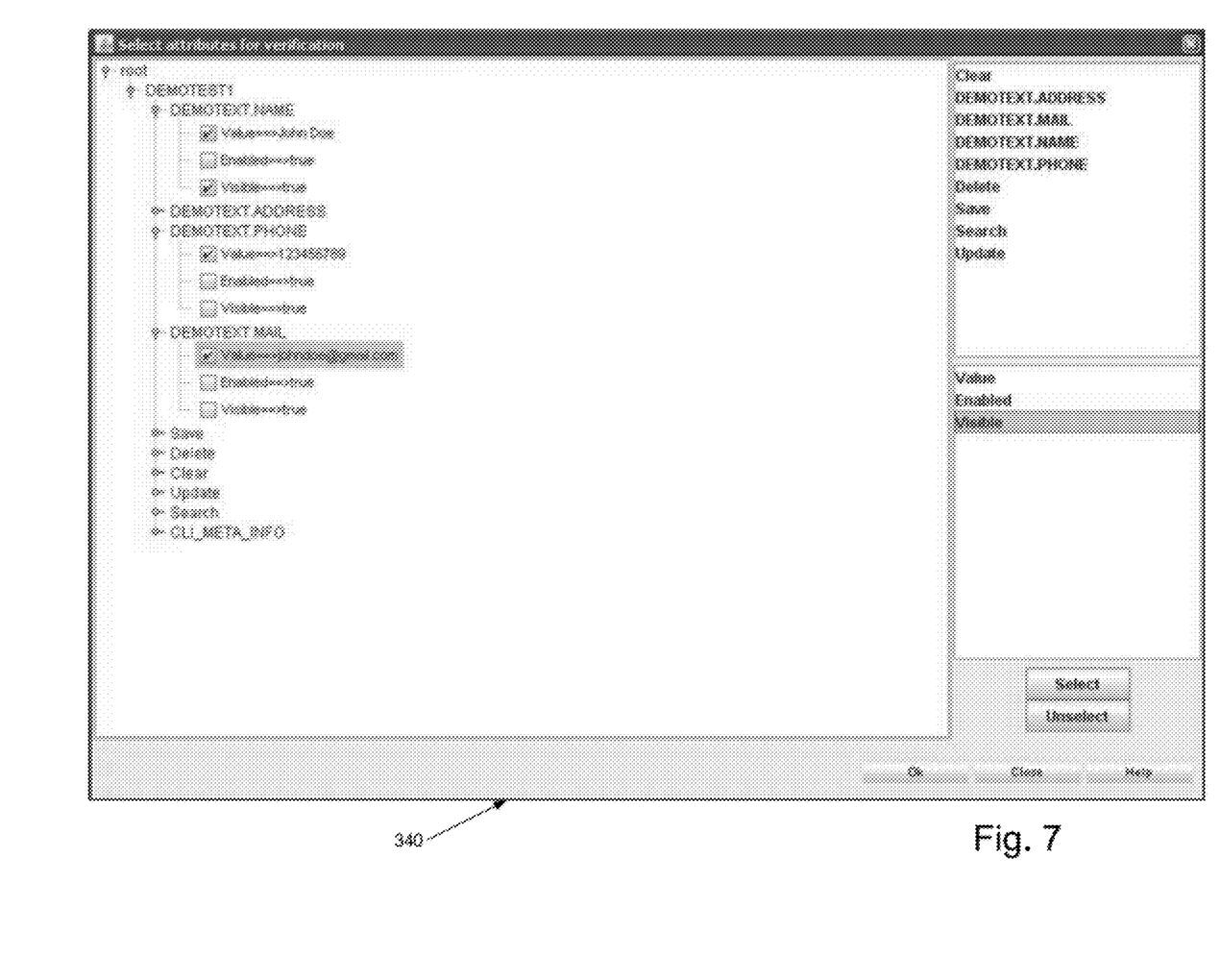
FIG. 7 is a diagram of an exemplary window for selecting attributes for verification in accordance with the present disclosure.

Referring now to FIG. 7, shown therein is a window 340 which shows the creation of a verification command. The window 340 displays values that have been read from the Address Book application (or any window). The user can select values to verify. In the FIG. 7, the user has selected DEMOTEXT.NAME indicating that the user intends to verify that the name in the Name field of the address book will be "John Doe" when the test script is played back later. If the name in the Name field is not "John Doe", then it is an error case and the test script has failed.

Generally, the window 340 provides exemplary attributes that can be selected for verification. This structured description is preferably presented in a simple GUI format for the tester to select. After the tester selects the values, a command for verification is printed. A verify command preferably has the following structure:

```
verifyEdit windowType:DIALOG windowIdentifier:addressBook
toVerify:DEMOTEST1.DEMOTEXT.NAME.Value→John
Doe%%DEMOTEST1.DEMOTEXT.PHONE.Value→123456789
%%DEMOTEST1.DEMOTEXT.MAIL.Value→johndoe@gmail.com
```

WindowType and windowIdentifier indicate on which window the verification command must be executed. The window is asked to describe itself, thus getting a nested key-value structure as described above. This is then compared with the strings in the toVerify part of the verifyEdit command to determining if the test succeeds or fails.

As discussed above, verification can be used to compare values on the graphical user interface 68 at the time of testing to values on the graphical user interface 68 later (a new release, bug fix, code re-factor etc.). These values are from graphical components 100 like dialogs, panels, tree, JGraph windows etc. Verification can catch changes in the computer application 66 GUI values resulting from code change or behavior change. Alternatively, users can select values they are interested in and that will be dumped as a command.

Since the command playback module 142 has access to the application windows, it is aware of when exactly GUI operation completes. As soon as a GUI operation is complete, the command playback module 142 receives another command from the command client 128 and repeats the playback steps described above. This enables the command playback module 142 to be synchronous and execute as fast as the computer application 66 can run, and avoid any set delays or sleep times. The speed of test case execution only depends on the speed in which the computer application 66 runs.

In order for the computer application 66 to implement the RAFFLE framework, one or more of the GUI application 110 and the command execution server 126 preferably contains the following components:
 1) A window manager that can keep track of all open windows. This in turn preferably requires every window of the computer application 66 to register/de-register itself on being opened/closed.
 2) All windows should be able to recognize all valid user GUI actions and translate them to commands.
 3) All windows preferably must describe themselves in a defined structure.
 4) A component, such as the command playback module 142 to convert commands to graphical user interface events to mimic user action.

In this disclosure, the computer system 10 for automating the testing of the graphical user interface 68 provides the RAFFLE framework that makes it easy to generate and maintain test scripts and that can be implemented for any GUI application 110. To summarize, particular embodiments of the computer system 10 have the following advantages
 1) Test script generation is straightforward. Test scripts can be generated by the computer application 66 being tested while a test case is being manually executed. The captured script can then be played back to exactly replicate the users actions.
 2) Execution of the test script can proceed in a synchronous manner in which there are no fixed delays involved. As discussed above, the command playback module 142 can be aware of when a command execution finishes and proceeds onto the next command. The speed of test case execution may only depend on the execution speed of the computer application 66 being tested.
 3) The verification module 144 automatically verifies that the graphical user interface events were executed by the application engine 112 by comparing the current values within the graphical user interface 68 of the computer application 66 to the values specified in the command to be verified. Users can select values they are interested in and that will be dumped as a command. During playback the values dumped will be compared to the current values.

4) The testing application 124 can be developed to be as independent of GUI application 110 as possible.
5) The test scripts are easily modifiable using scripting languages like Perl. This ensures the scripts can always be kept up to date easily.
6) The testing application 124 can be implemented for any platform that can mimic user actions programmatically. Exemplary platforms include JAVA, Windows or Macintosh.

As it will be appreciated by persons of ordinary skill in the art, changes may be made in the construction and the operation of the various components, elements and assemblies described herein or in the steps or the sequence of steps of the methods described herein without departing from the spirit and scope of the inventive concept(s) disclosed herein.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposes of this disclosure, it will be understood that numerous changes may be made which will readily suggest themselves to those skilled in the art and which are accomplished within the spirit of the inventive concept(s) disclosed and claimed herein.

What is claimed is:

1. A computer system, comprising:
   a display, which is configured to show a window, the window including a first panel and a plurality of second panels, the first panel including a plurality of text fields;
   one or more computer readable medium storing a computer application comprising computer executable code for creating a graphical user interface;
   one or more processors receiving and executing the computer executable code to provide the graphical user interface on the display;
   the one or more computer readable medium also storing a testing application comprising computer executable code for activating the graphical user interface, the testing application defining a command execution server embedded into the computer application, and a command client external to the computer application;
   wherein, upon execution by the one or more processors, the command execution server receives a command for the graphical user interface from the command client, interprets the command, enables the execution of the command by the computer application by generating a graphical user interface event in the graphical user interface of the computer application, and sends an acknowledgement to the command client responsive to the computer application completing execution of the command, the graphical user interface supplying a plurality of nested key-value pairs associated with the first panel, a number of the plurality of nested key value pairs being a sum of a number of the plurality of text fields and a number of the plurality of second panels, wherein the command execution server includes a verification module to compare first graphical user interface values including values of information shown on the display after execution of the command to second graphical user interface values specified in the command, and to generate an alert responsive to the first graphical user interface values and the second graphical user interface values being mismatched.

2. The computer system of claim 1, wherein the command is a first command, and wherein the command client sends a second command for the graphical user interface to the command execution server responsive to receiving the acknowledgement from the command execution server.

3. The computer system of claim 1, wherein the computer executable code of the computer application defines a GUI application having windows that register with the command execution server.

4. The computer system of claim 1, wherein the command includes an indication of an action by a user, the action being one of a mouse click by the user, a key pressed by the user, and a menu selected by the user.

5. A computer system, comprising:
   a display, which is configured to show a window, the window including a first panel and a plurality of second panels, the first panel including a plurality of text fields;
   one or more computer readable medium storing a computer application comprising computer executable code for creating a graphical user interface; and
   one or more processors receiving and executing the computer executable code to provide the graphical user interface on the display;
   the one or more computer readable medium also storing a testing application comprising computer executable code for activating the graphical user interface of the computer application, the testing application defining a command execution server embedded into the computer application, and a command client external to the computer application, the graphical user interface supplying a plurality of nested key-value pairs associated with the first panel, a number of the plurality of nested key value pairs being a sum of a number of the plurality of text fields and a number of the plurality of second panels;
   the command execution server comprising: a playback module for receiving and interpreting commands received from the command client and executing the received commands by generating graphical user interface events in the graphical user interface of the computer application, and a verification module for comparing first graphical user interface values including values of information shown on the display after execution of the commands to second graphical user interface values specified in the received command and generating an alert responsive to the first graphical user interface values and the second graphical user interface values being mismatched.

6. The computer system of claim 5, wherein the received command is a first command, and wherein the command client sends a second command for the graphical user interface to the command execution server responsive to receiving an acknowledgement from the command execution server.

7. The computer system of claim 5, wherein the command includes an indication of an action by a user, the action being one of a mouse click by the user, a key pressed by the user, and a menu selected by the user.

8. A method, comprising the steps of:
   receiving a command by a command execution server embedded in a computer application that is being executed by one or more processors of a computer system from a command client external of the computer application;
   interpreting the command;
   converting the command to a graphical user interface event on a display, which is configured to show a window, the window including a first panel and a plurality of second panels, the first panel including a plurality of text fields;

supplying the graphical user interface event to a graphical user interface (GUI) application of the computer application;

monitoring execution of the graphical user interface event by the command execution server, the GUI application creating a graphical user interface on the display that supplies a plurality of nested key-value pairs associated with the first panel, a number of the plurality of nested key value pairs being a sum of a number of the plurality of text fields and a number of the plurality of second panels; and supplying an acknowledgement of completion of execution of the graphical user interface event by the command execution server to the command client, wherein the command execution server includes a verification module to compare first graphical user interface values including values of information shown on the display after execution of the command to second graphical user interface values specified in the command, and further comprising the step of generating an alert by the verification module responsive to the first graphical user interface values and the second graphical user interface values being mismatched.

9. The method of claim 8, wherein the command is a first command, and wherein the command client sends a second command to the command execution server responsive to receiving the acknowledgement from the command execution server.

10. The method of claim 8, wherein the computer application includes computer executable code defining the GUI application having windows, and wherein the method further comprises the step of registering the windows with the command execution server.

11. The method of claim 8, wherein the command includes an indication of an action by a user, the action being one of a mouse click by the user, a key pressed by the user, and a menu selected by the user.

12. An article, comprising:
one or more non-transitory computer readable medium storing a computer application comprising computer executable code for creating a graphical user interface on a display, which is configured to show a window, the window including a first panel and a plurality of second panels, the first panel including a plurality of text fields, the graphical user interface supplying a plurality of nested key-value pairs associated with the first panel, a number of the plurality of nested key value pairs being a sum of a number of the plurality of text fields and a number of the plurality of second panels, such that upon execution of the computer application by one or more processors causes the one or more processors to (1) receive a command by a command execution server embedded in the computer application that is being executed by the one or more processors from a command client external of the computer application, (2) interpret and convert the command to a graphical user interface event, (3) supply the graphical user interface event to a graphical user interface (GUI) application of the computer application, (4) monitor execution of the graphical user interface event by the command execution server, and (5) supply an acknowledgement of completion of execution of the graphical user interface event by the command execution server to the command client, wherein upon execution by one or more processors, the computer executable code further causes the one or more processors to (1) compare by a verification module first graphical user interface values including values of information shown on the display after execution of the command to second graphical user interface values specified in the command, and (2) generate an alert by the verification module responsive to the first graphical user interface values and the second graphical user interface values being mismatched.

13. The article of claim 12, wherein the command includes an indication of an action by a user, the action being one of a mouse click by the user, a key pressed by the user, and a menu selected by the user.

14. An article, comprising:
one or more non-transitory computer readable medium storing a computer application comprising computer executable code for creating a graphical user interface (GUI) on a display, which is configured to show a window, the window including a first panel and a plurality of second panels, the first panel including a plurality of text fields, the one or more computer readable medium also storing a testing application comprising computer executable code for activating the graphical user interface, the testing application defining a command execution server embedded into the computer application, and a command client external to the computer application; wherein the command execution server is adapted to cause one or more processors to receive a command for the graphical user interface from the command client, the GUI supplying a plurality of nested key-value pairs associated with the first panel, a number of the plurality of nested key value pairs being a sum of a number of the plurality of text fields and a number of the plurality of second panels, the command execution server also being adapted to interpret the command and enable the execution of the command by the computer application by generating a graphical user interface event in the graphical user interface of the computer application, and send an acknowledgement to the command client responsive to the computer application completing execution of the command, wherein the command execution server includes a verification module to compare first graphical user interface values including values of information shown on the display after execution of the command to second graphical user interface values specified in the command to be verified, and to generate an alert responsive to the first graphical user interface values and the second graphical user interface values being mismatched.

15. The article of claim 14, wherein the command is a first command, and wherein the command client is adapted to send a second command for the graphical user interface to the command execution server responsive to receiving the acknowledgement from the command execution server.

16. The article of claim 14, wherein the computer executable code of the computer application defines a GUI application having windows that register with the command execution server.

17. The article of claim 14, wherein the command includes an indication of an action by a user, the action being one of a mouse click by the user, a key pressed by the user, and a menu selected by the user.

* * * * *